United States Patent [19]

Takeno et al.

[11] Patent Number: 4,761,267

[45] Date of Patent: Aug. 2, 1988

[54] ALUMINUM ALLOY FOR USE AS CORE OF CLAD MATERIAL

[75] Inventors: Shinji Takeno, Fukaya; Seishi Nakamoto, Oosato; Kouhei Oono, Fukaya, all of Japan

[73] Assignee: Sky Aluminium Co., Ltd., Tokyo, Japan

[21] Appl. No.: 10,501

[22] Filed: Feb. 3, 1987

[30] Foreign Application Priority Data

Mar. 31, 1986 [JP] Japan ................................. 61-73621

[51] Int. Cl.⁴ ........................................... C22C 21/12
[52] U.S. Cl. .................... 420/529; 148/438; 148/439; 420/533; 420/535; 420/537; 420/538
[58] Field of Search ............... 420/529, 533, 535, 537, 420/538; 148/438, 439

[56] References Cited

U.S. PATENT DOCUMENTS 4,039,298 8/1977 Anthony et al. .................... 420/537
4,167,410 9/1979 Anthony et al. .................... 420/528

FOREIGN PATENT DOCUMENTS 58-23560 5/1983 Japan .
58-24719 5/1983 Japan .
59-89999 5/1984 Japan .
59-205445 11/1984 Japan .
60-224741 11/1985 Japan .

Primary Examiner—R. Dean
Attorney, Agent, or Firm—Armstrong, Nikaido, Marmelstein & Kubovcik

[57] ABSTRACT

An aluminum alloy-core material for brazing, having improved secular corrosion resistance is provided, by a composition of 0.5~1.0% of Cu, 0.5~1.0% of Mn, 0.10~0.30% of Ti, 0.3% or less of Fe, less than 0.10% of Si, and balance of Al, and contains, occasionally at least one element selected from the group consisting of from 0.05 to 0.4% of Mg, from 0.05 to 0.4% of Cr, and from 0.05 to 0.4% of Zr. The alloy is free of an Al-Fe intermetallic compound, has an improved resistance to pitting corrosion and exhibits only a slight reduction in mechanical strength after brazing.

8 Claims, 6 Drawing Sheets

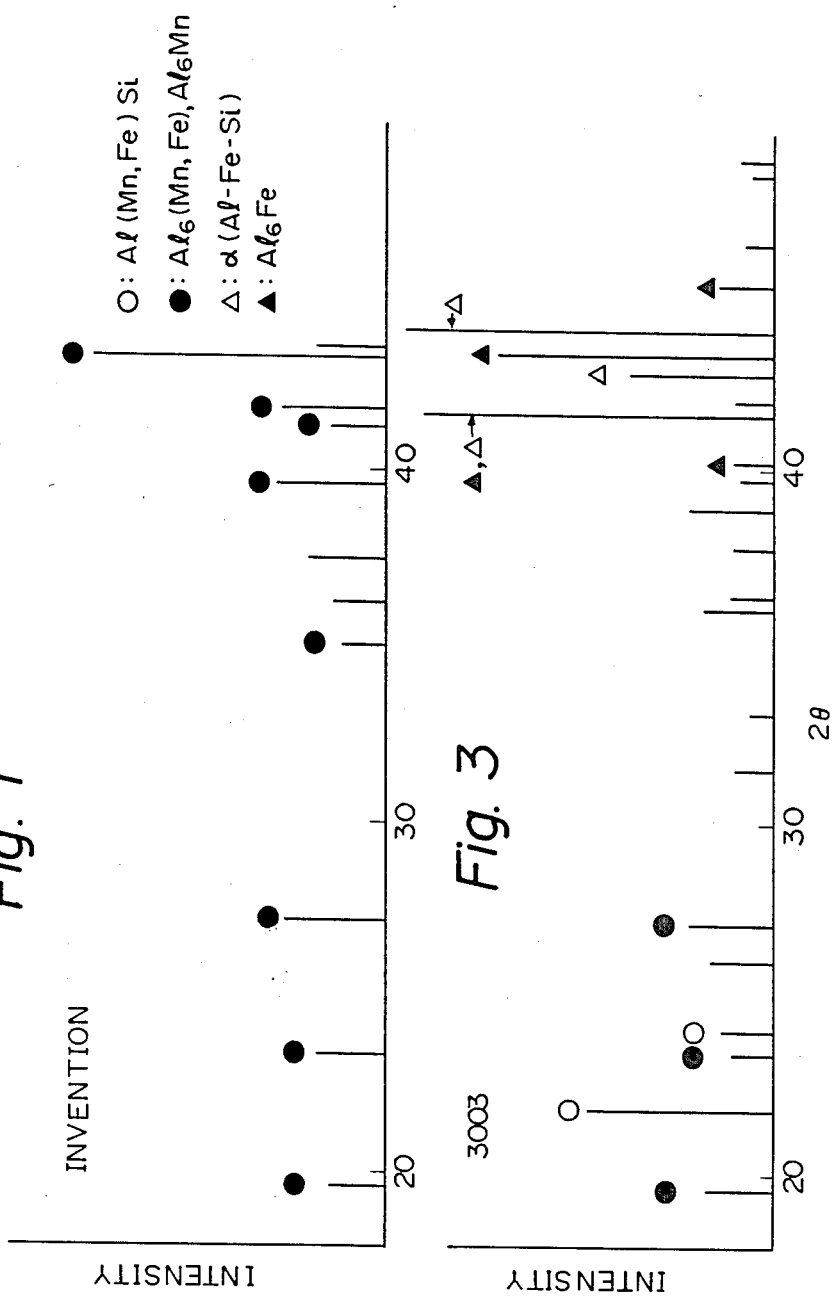

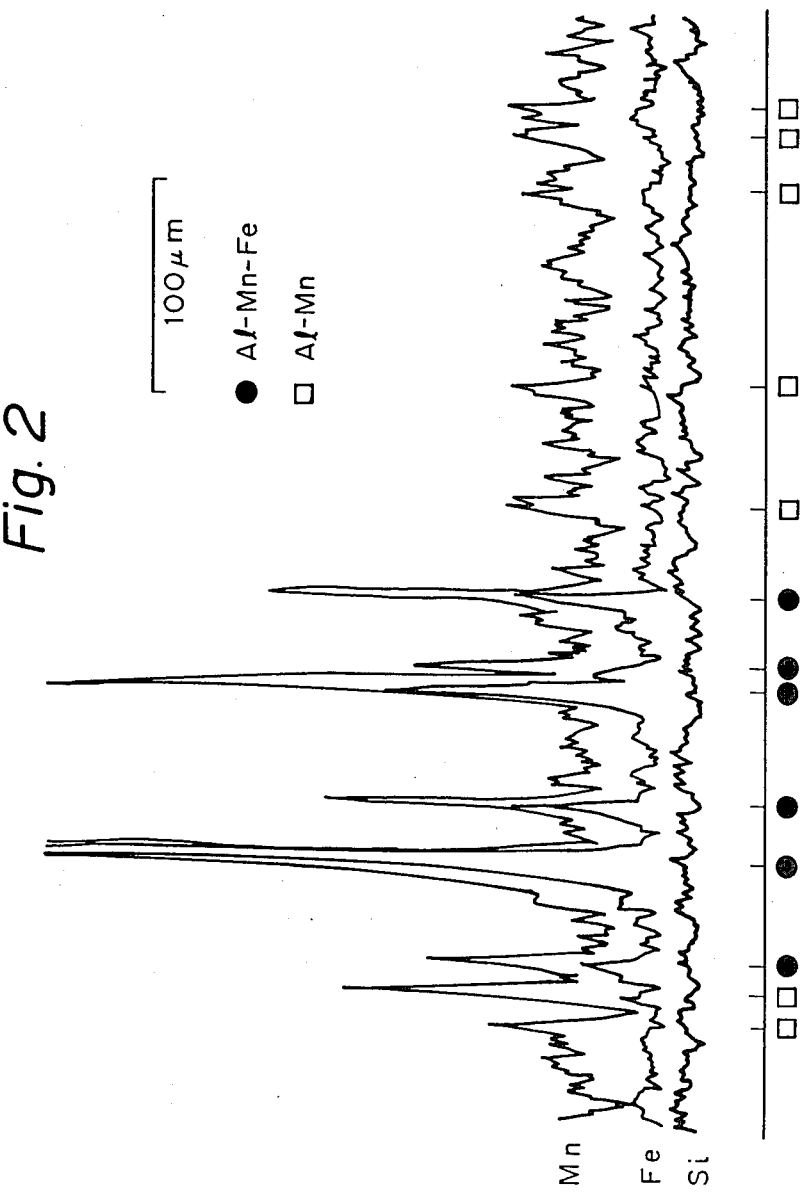

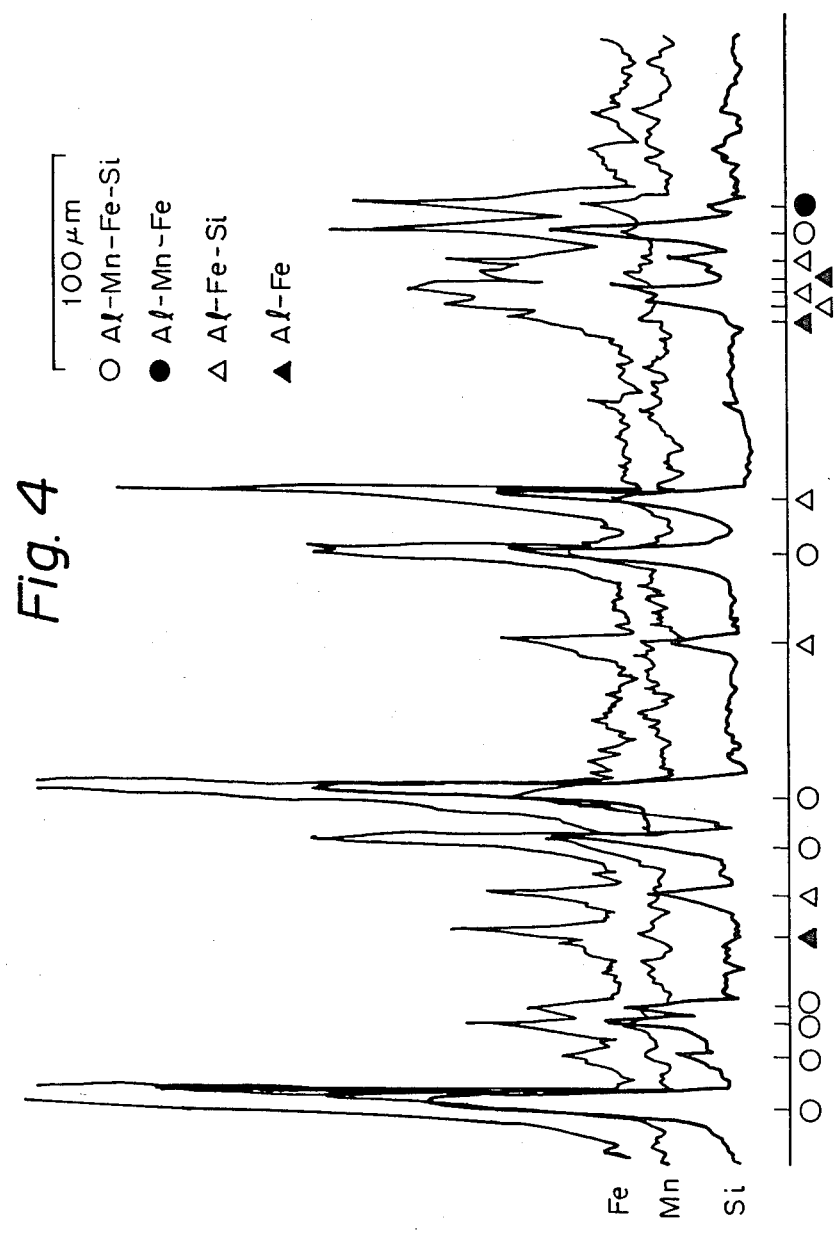

(×25)

(×25)

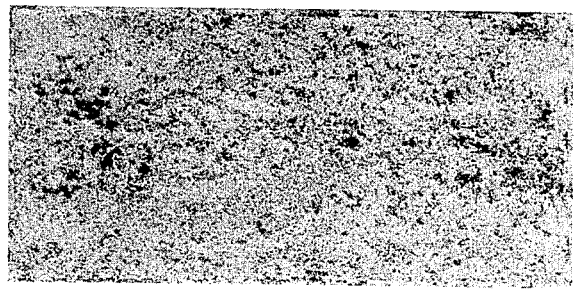
Fig. 7 (x 2/3)
Fig. 8 (x 2/3)

ALUMINUM ALLOY FOR USE AS CORE OF CLAD MATERIAL

BACKGROUND OF THE INVENTION

1. Field of the Invention

The present invention relates to an aluminum alloy which is used as a core of the clad material used as a passageway for a fluid, such as water, in a brazed assembly, such as a header plate, tube, drawn cup, and the like, of a heat exchanger for automobiles. More particularly, the present invention relates to an aluminum alloy-core material for fluid-passageway use, having improved corrosion resistance and mechanical properties after brazing.

2. Description of the Related Arts

Generally, a passageway for a fluid in a brazed assembly, such as a header plate, tube, drawn cup, and the like of a heat exchanger made of aluminum alloy, such as a heat exchanger for automobiles, consists of: the core material, for which 3003 alloy (Al-Mn series alloy) according to the relevant JIS standard or AA standard (hereinafter, all alloy designations are according to the JIS standard or AA standard) or 6951 alloy (Al-Mg-Si series alloy) is used; and a clad material, which is an Al-Si series- or Al-Si-Mg series-filler metal, or sacrificial anode made of, e.g. 1070 alloy, and which is clad on one or both surfaces of the core material. The fluid passageway consisting of the clad material as described above is bonded with the articles to be brazed, such as the fin materials, thereby forming the brazed assembly.

A number of corrosion protection techniques of materials for the heat exchangers, utilizing a sacrificial anode, are known. But, as shown in Japanese Examined Patent Publications No. 58-23560 and No. 58-24179, most of those techniques propose to use the fin material as the sacrificial anode. The sacrificial anode effect by the fin materials can not be expected, however, when a part of or the whole of the fluid-passageway is positioned far from the fin materials.

In addition, there have been disclosed techniques for cladding the sacrificial anode layer on the fluid passageway at a part thereof in contact with the fluid, for example, as in Japanese Unexamined Patent Publications No. 59-89999 and No. 59-205445. In this case, the sacrificial anode layer is of a specified kind and all other kinds are ineffective. In addition, the corrosion resistance of the sacrificial anode layer seems to be poor on the ambient air side, and the corrosion resistance of the core material per se seems to be poor.

The core of the clad material used as a passageway for a fluid, such as water, in a brazed assembly of a heat exchanger made of an aluminum alloy, must have an excellent corrosion resistance and the mechanical properties required for the brazed structure. The 3003 alloy and 6951 alloy conventionally used as the core material as described above allegedly have a relatively good corrosion resistance and attains a fair degree of mechanical strength. But, in actual use as the core material, the corrosion resistance thereof at a part in contact with the ambient air and a part in contact with various fluids is not always sufficient, with the result that, occasionally, pitting corrosion and intergranular corrosion occur, depending upon the environment, to render the assembly useless. Regarding the strength, since heating to a high temperature is carried out upon brazing when a brazed structure is assembled, softening occurs and causes a reduction of the mechanical properties of core material, with the result that the strength required for the core material is not always obtained. Accordingly, it is clear that a core material which thoroughly satisfies both the requirements for corrosion resistance and strength after brazing, heretofore could not be obtained.

Japanese Unexamined Patent Publication No. 59-89999 proposes, as a core material, to decrease the Cu and Mn of AA 6951 and to add one or more of Cr, Ti, and Zr, to lessen the sensitivity to intergranular corrosion. It also proposes to make a composite cladding material with a Ca addition, to enhance the corrosion resistance of the core material. Note, the composition of the core material is usually 0.2~0.8 wt % of Cu, 0.1~0.8 wt % of Mn, 0.1~0.5% of Mg, 0.1~0.6 wt % of Si, and one or more of 0.01~0.3 wt % of Cr, 0.01~0.3 wt % of Zr, and 0.01~0.3 wt % of Ti, and a balance of Al.

The corrosion resistance of core material (the maximum pitting depth) is constant within the above compositional range not depending upon the contents of elements.

In the invention of the publication mentioned above, a calcium-containing aluminum alloy must be used for the inner cladding material of a water chamber, since Fe is an impurity in this invention.

In the case of not intentionally adding Fe, it is possible that Fe is incorporated in the alloy produced industrially in an amount of 0.7% by weight at most. The alloy of this invention is strengthened by Mg and Si, but the resistance against intergranular corrosion and pitting corrosion may not be satisfactory, due to the Mg and Si contents, and a rather high Fe content, concretely exceeding 0.3 wt % of Fe.

As shown for example in Japanese Unexamined Patent Publication No. 59-89999, the corrosion protection of core material due to a sacrificial anode has been heretofore evaluated by an electrode potential of the core material. It has, however, been discovered by the present inventors that such an electrode potential does not provide information about how long the core material can be protected cathodically by a sacrificial anode or filler metal.

SUMMARY OF THE INVENTION

It is an object of the present invention to provide an aluminum alloy-core for brazing, used as a fluid passageway, and having an improved corrosion resistance and mechanical strength.

It is another object of the present invention to provide an aluminum alloy-core for brazing, which has an improved secular corrosion resistance and hence can be protected against corrosion, over a long period of time, by a sacrificial anode or filler metal.

It is a further object of the present invention to provide an aluminum alloy-core for brazing, which does not essentially exhibit pitting corrosion, when used as a clad core for a fluid-passageway in a header plate, tube, or a drawn cup of an automobile-heat exchanger.

In accordance with the objects of the present invention, there is provided an aluminum alloy-core material (hereinafter called the first core material) for brazing, having an improved secular corrosion resistance due to a sacrificial anode or a filler material, when used in the manufacture of brazed assemblies, which consists of 0.5~1.0% of Cu, 0.6~1.0% of Mn, 0.10~0.30% of Ti, 0.3% or less of Fe, less than 0.10% of Si, and a balance of Al, which exhibits only a slight reduction in mechanical strength after brazing, and, in which any Fe-containing intermetallic compound of Al further contains Mn, thereby rendering said material resistant against pitting corrosion.

There is also provided an aluminum alloy-core material (hereinafter called the second core material) for brazing, having an improved secular corrosion resistance due to a sacrificial anode or a filler metal, when used in the manufacture of brazed assemblies, which consists of 0.5~1.0% of Cu, 0.6~1.0% of Mn, 0.10~0.30% of Ti, 0.3% or less of Fe, less than 0.10% of Si, at least one element selected from the group consisting of from 0.05 to 0.4% of Mg, from 0.05 to 0.4% of Cr, and from 0.05 to 0.4% of Zr, and a balance of Al, which exhibits only a slight reduction in mechanical strength after brazing, and, in which any Fe-containing intermetallic compound of Al further contains Mn, thereby rendering said material resistant against pitting corrosion.

The core materials of the invention as described above have the Al-Si series or Al-Si-Mg series filler metal or sacrificial anode clad on either side or both sides thereof and are used as the fluid passageway.

BRIEF DESCRIPTION OF THE DRAWINGS

FIG. 1 is a graph showing the X-ray (Cu target) diffraction intensity of alloy No. 3 in Table 1.

FIG. 2 is an EPMA chart of the alloy No. 3.

FIG. 3 is a graph showing the X-ray (Cu target) diffraction intensity of conventional alloy 3003 in Table 1.

FIG. 4 is an EPMA chart of the conventional alloy 3003 in Table 1.

FIGS. 7 and 8 are photographs showing the surface states after the CASS test of alloy No. 3 according to the present invention and alloy No. 15 (3003), respectively (magnification ×2/3).

DESCRIPTION OF THE PREFERRED EMBODIMENTS

Figure 5:
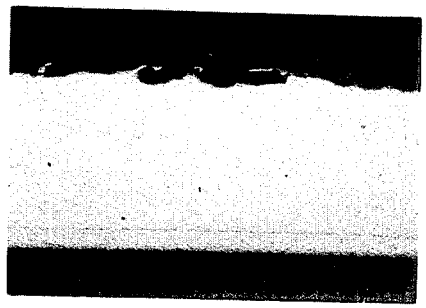
FIGS. 5 and 6 are photographs showing the cross section of the deepest pitting corroded part of alloy No. 3 according to the present invention and alloy No. 15 (3003), respectively (magnification ×25).

The compositions of the core materials of the invention are now described.

Cu

Cu shifts the electrode potential toward the relatively positive direction, thereby allowing the filler metal and sacrificial anode to demonstrate the effect of a sacrificial anode. Cu enhances the strength after the brazing. If the Cu content is less than 0.5%, it is difficult to maintain the electrode potential of 50 mV or more between the core material and, particularly, the filler metal. In this case, the effect of a sacrificial anode cannot be expected. Cu, however, degrades the corrosion resistance of the core material per se, not relying on the sacrificial anode (hereinafter referred to as the self corrosion resistance). If the Cu content exceeds 1.0%, the self corrosion resistance is extremely lowered. The Cu content is, therefore, specified to be in the range of from 0.5 to 1.0%.

Mn

Mn prevents the lowering of the self corrosion resistance due to the Cu addition as described above, enhances the strength after brazing, and lowers the corrosion speed of the filler material and sacrificial anode. More specifically, the cathode polarization resistance is increased by the Mn addition, compared with an Al-Cu alloy without a Mn addition, so that the Mn addition effectively reduces the corrosion current. In addition, the Mn addition converts the Al-Fe series crystal, which is the origin of the pitting corrosion and causes a growth thereof, to the Al-Mn-Fe series intermetallic compound, which exhibits a small difference in the electrode potential relative to the matrix, thereby enhancing the resistance against pitting corrosion. Investigations to date have found that the Al-Mn-Fe series intermetallic compound is most likely to be Al-Mn-Fe crystal, but may be Al-Mn crystal containing solute Fe.

Mn also enhances the strength after brazing. If the Mn content is less than 0.6%, these effects, particularly the effect of preventing the lowering of the self corrosion resistance cannot be satisfactorily attained. A large amount of Mn must be added to increase the cathode polarization. However, if the Mn content exceeds 1.0%, the sensitivity of the intergranular corrosion is enhanced, due to the Mn addition, during the heating upon brazing. The Mn content is, therefore, specified to be in the range of from 0.6 to 1.0%.

If the cooling after heating for brazing is extremely slow, the sensitivity to intergranular corrosion is enhanced. In this case, the Mn content is preferably 0.8% at the highest.

Ti

Ti refines and uniformizes the structure, thereby not only enhancing the self corrosion resistance but also increasing the cathode polarization relative to the Al-Cu alloy, as does the Mn, and thus reduces the corrosion current. If the Ti content is less than 0.10%, these effects are not attained. In order to increase the cathode polarization, the Ti content must be high. But, if the Ti content exceeds 0.30%, not only do the Ti effects reach saturation but also an enormous intermetallic compound is formed and, the workability is degraded. The Ti content is, therefore, specified to be in the range of from 0.10 to 0.30%. Since the upper limits of Ti and Mn are specified for the reasons described above, the addition of both thereof is indispensable for attaining a satisfactorily large cathode polarization.

Fe

Fe is one of the impurity elements which are unavoidably contained in ordinary aluminum alloy. Fe promotes the formation of the Al-Fe series intermetallic compound in the casting step, which compound is the origin of the pitting corrosion and causes a growth thereof. Fe also promotes the precipitation of Al-Mn series or Al-Mn-Fe series intermetallic compound during the cooling after heating for brazing, and the like, which Al-Mn or Al-Mn-Fe series intermetallic compound cause the intergranular corrosion when precipitated in the grain boundaries. Desirably the Fe content is kept as low as possible. Since, however, a high purity base metal is expensive, the Fe content is, therefore, specified to be not more than 0.3%.

Although as low as possible an Fe content is desirable, an Fe content of 0.1% or more will give a satisfactory effect.

Si

Si is also one of the impurity elements which are unavoidably contained in ordinary aluminum alloy. Si promotes the precipitation of the Al-Mn series and Al-Mn-Fe series intermetallic compound, which causes the intergranular corrosion, as does Fe as described above. The Si content is desirably as low as possible. Particularly, in the second core material with the Mg addition, $Mg_2Si$ precipitates in the grain boundaries due to the heating for brazing, and enhances the sensitivity to intergranular corrosion. The Si content must, therefore, be strictly limited, and thus the Si content must be less than 0.10%.

In the first core material, the components other than those described above are aluminum and unavoidable impurities. In the second core material, the components other than those mentioned above include one or more of Mg, Cr, and Zr.

Mg

Mg is the most effective element for enhancing the strength after brazing. If the Mg content is less than 0.05%, the Mg effect is small. On the other hand, if the Mg content is more than 0.4%, electrode potential of the core material is shifted to a less noble direction, so that, particularly, the sacrificial anode-effect is not attained. The Mg content is, therefore, limited to the range of from 0.05 to 0.4%.

Cr, Zr

These elements are also effective for enhancing the strength after brazing. If the content of Cr or Zr is less than 0.05%, the effect thereof is small. On the other hand, if the content of Cr or Zr exceeds 0.4, an enormous intermetallic compound is formed and the workability is degraded. The content of Cr or Zr is, therefore, kept within the range of from 0.05 to 0.4%.

When the core materials of present invention having the compositions described above are actually used for a fluid passageway in a brazed assembly, such as a heat exchanger, either side or both sides of the core material are clad with an Al-Si series filler metal represented by BA 4343 brazing alloy and BA 4045 brazing alloy, an Al-Si-Mg series brazing alloy represented by 4004 brazing alloy, or a sacrificial anode-material represented by 1070 alloy, so that the clad has a requisite thickness. Since the core materials of the present invention, clad with filler metal or sacrificial anode material have a relatively positive electrode potential with regard to the cladding materials as described above, therefore, even if the core material is exposed due to a corrosion of the cladding materials, there is no danger that the corrosion (pitting corrosion) will affect to the core material. In addition, the corrosion speed of the cladding materials is slow and the self corrosion resistance of the core materials is improved.

The methods for manufacturing the clad core materials of present invention are not limited at all but are preferably as described below.

First, the core materials of the present invention are superimposed, on either side or both sides thereof, upon the filler metal or sacrificial anode material, and are then hot-cladding rolled at a temperature of from 450° to 520° C., and subsequently, subjected to cold-rolling at a rolling degree of 60% or more. Preferably the final annealing at a temperature of from 300° to 450° C. for the time period of from 1 to 10 hours is subsequently carried out. Preferably a homogenizing treatment at a high temperature and for a long period of time is not carried out before the hot rolling. Also, it is evident that, if necessary, an intermediate annealing is carried out after the hot-rolling or in the course of cold-rolling.

EXAMPLES

Clad materials 1.5 mm in thickness were manufactured by cladding 4004 alloy-filler material on one side of each core material shown in Table 1, and cladding 1070 alloy (inner cladding material, sacrificial anode-material) on the other side, so that each cladding material has a thickness of 10% of the clad materials.

TABLE 1

| Alloy Designation | Alloy No. | Chemical Composition (wt %) | | | | | | | |
|---|---|---|---|---|---|---|---|---|---|
| | | Cu | Mn | Fe | Si | Ti | Mg | Cr | Zr |
| Inventive Alloy | 1 | 0.5 | 0.6 | 0.1 | 0.08 | 0.10 | 0.1 | — | — |
| | 2 | 1.0 | 0.6 | 0.2 | 0.08 | 0.15 | — | — | — |
| | 3 | 0.6 | 0.8 | 0.2 | 0.07 | 0.10 | 0.2 | — | — |
| | 4 | 0.5 | 0.7 | 0.1 | 0.08 | 0.20 | — | — | — |
| | 5 | 0.5 | 0.7 | 0.2 | 0.08 | 0.10 | — | 0.2 | — |
| | 6 | 0.8 | 1.0 | 0.2 | 0.07 | 0.20 | 0.3 | — | 0.1 |
| | 7 | 0.6 | 0.8 | 0.1 | 0.08 | 0.10 | — | 0.3 | 0.2 |
| | 8 | 0.8 | 0.8 | 0.2 | 0.08 | 0.30 | — | — | — |
| Comparative Material | 9 | 0.6 | — | 0.1 | 0.08 | 0.10 | — | — | — |
| | 10 | 1.2 | 0.8 | 0.3 | 0.08 | 0.10 | — | — | — |
| | 11 | 0.5 | 0.5 | 0.4 | 0.08 | 0.10 | — | — | — |
| | 12 | 0.5 | 0.5 | 0.2 | 0.08 | 0.01 | — | — | — |
| | 13 | 0.6 | 0.8 | 0.2 | 0.3 | 0.10 | 0.6 | — | — |
| | 14 | 0.3 | 0.7 | 0.2 | 0.08 | 0.10 | — | — | — |
| Conventional Alloy (3003) | 15 | 0.1 | 1.1 | 0.7 | 0.3 | — | — | — | — |
| Conventional Alloy (6951) | 16 | 0.2 | 0.1 | 0.5 | 0.4 | — | 0.5 | — | — |

The clad materials were subjected to a treatment corresponding to vacuum brazing, that is, heating to 605° C. for 5 minutes in a vacuum of $10^{-4}$ to $10^{-6}$ Torr. Subsequently, the inner cladding material was removed by a 10% NaOH aqueous solution at a temperature of 60° C. The exposed cores of the clad materials were anodically polarized in a 2.67% $AlCl_3$ solution at 25° C., to determine the pitting corrosion potential. The results are shown in Table 2.

Clad material, in which the core material No. 1 according to the present invention was used, was subjected to the same treatment corresponding to vacuum brazing as described above, and subsequently, without removal of the inner cladding material, subjected to an investigation of the pitting corrosion potential of the filler metal (4004 alloy) and inner cladding material (1070 alloy) by anodically polarizing the clad materials as they were. These results are also shown in Table 2.

As is apparent from Table 2, the pitting corrosion potential of all of the core alloys according to the present invention is higher than that of the filler metal (4004 alloy) by 0.07 to 0.13V. It has heretofore been known that the effects of a sacrificial anode are satisfactorily demonstrated at a potential difference of at least approximately 0.05V. The core alloys according to the present invention thoroughly satisfy the potential difference of at least 0.05V, and, therefore, can effectively demonstrate the sacrificial anode-effect of the filler metal. Conversely, in the conventional core alloys No. 15 (3003 alloy) and No. 16 (6951 alloy), and the comparative core alloys No. 13 and No. 14, the potential difference relative to the filler metal virtually does not exist or is less than 0.05V, and thus the sacrificial anode effect cannot be expected.

TABLE 2

| Alloy Designation | Alloy No. | Pitting Potential (V vs SCE) |
| --- | --- | --- |
| Inventive Alloy | 1 | −0.67 |
| | 2 | −0.62 |
| | 3 | −0.67 |
| | 4 | −0.67 |
| | 5 | −0.67 |
| | 6 | −0.68 |
| | 7 | −0.65 |
| | 8 | −0.64 |
| Comparative Material | 9 | −0.68 |
| | 10 | −0.61 |
| | 11 | −0.66 |
| | 12 | −0.67 |
| | 13 | −0.72 |
| | 14 | −0.71 |
| Conventional Alloy (3003) | 15 | −0.75 |
| Conventional Alloy (6951) | 16 | −0.73 |
| Filler Metal | 4004 | −0.75 |
| Inner Clad Material | 1070 | −0.79 |

Subsequent to heating corresponding to the vacuum brazing, the tensile strength of all of the above described clad materials was tested under the condition of as heated. In addition, after this heating corresponding to the vacuum brazing, the inner cladding material-1070 alloy was sealed by a sealing tape, and the CASS test according to JIS H 8681, which is a test similar to a salt spray test, was carried out for 1000 hours to determine the depth of the pitting corrosion. Furthermore, after the heating corresponding to the vacuum brazing, the filler metal-4004 alloy was sealed, and a dipping test then carried out to determine the depth of the pitting corrosion. In this test, the testing liquid was ASTM ten-times (1000 ppm of $Cl^-$, $SO_4^{2-}$ and $HCO_3^-$, each) water + 10 ppm $Cu^{2+}$, the temperature cycle was 80° C.×8 hours room temperature×16 hours, and the test time was 1000 hours. The test results are shown in Table 3. Note, the average depth of the pitting corrosion shown in the CASS test Test-Result column is the average value of the ten deepest corrosion pits.

CASS and dipping tests. It was also confirmed that a satisfactory strength after brazing is attained.

Figure 6:
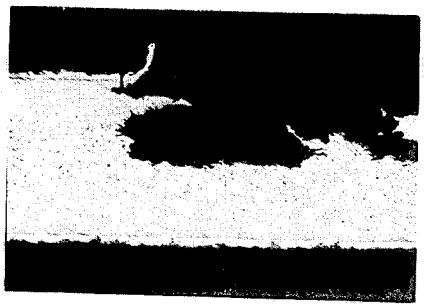

When comparing FIG. 5 (alloy No. 3 according to the present invention) and FIG. 6 (conventional alloy 3003), it can be understood that, under the CASS test condition, the latter is a pitting corrosion type and the former is a corrosion type exhibiting entire corrosion without substantial pitting. That is, the corrosion type of alloy according to the present invention is distinguished from that of 3003 alloy. FIG. 7 shows a corrosion state of alloy No. 3 under the CASS test, and FIG. 8 shows that of 3003 alloy. As understood from a comparison of FIG. 7 with FIG. 8, the corrosion type of the alloy according to the present invention is virtually uniform over the surface thereof.

In the comparative alloy No. 9 of the core material, the corrosion resistance is poor because there was no addition of Mn. In the comparative alloy No. 10 of the core material, the Cu addition amount is excessive. The lowered corrosion resistance in this case seems to be attributable to the degradation of the self corrosion resistance due to Cu. In the comparative alloy No. 11 of the core material, an excellent corrosion resistance is not obtained mainly because of an excessive inclusion of Fe. In the comparative alloy No. 12 of the core material, a satisfactory corrosion resistance is not obtained, mainly because the Ti content is too small to attain a corrosion improvement effect. In the comparative alloy No. 13 of the core material, the corrosion resistances is considerably lowered, because the excessive Mg amount does not shift the potential to a satisfactorily relatively positive state to attain the sacrificial anode effect of the filler metal, and further, because the excessive Si amount causes the corrosion resistance to be greatly lowered. In the comparative alloy No. 14 of the core material, the Cu addition is too small to attain a satisfactorily relatively positive potential of the core material, and thus attain a sacrificial anode effect. The corrosion resistance is, therefore, unsatisfactory.

An improved corrosion resistance according to the present invention is attributable to the composition and structure thereof.

TABLE 3

| Alloy Designation | Alloy No. | CASS Test-Result | | Tensile Strength After Heating Corresponding to Vacuum Brazing (kgf/mm²) | Dipping Test Result: Maximum Pitting Depth (mm) |
| --- | --- | --- | --- | --- | --- |
| | | Maximum Pitting Depth (mm) | Average Pitting Depth (mm) | | |
| Inventive Alloy | 1 | 0.21 | 0.13 | 12 | <0.15 |
| | 2 | 0.20 | 0.13 | 13 | <0.15 |
| | 3 | 0.19 | 0.11 | 14 | <0.15 |
| | 4 | 0.19 | 0.13 | 12 | <0.15 |
| | 5 | 0.22 | 0.11 | 13 | <0.15 |
| | 6 | 0.23 | 0.13 | 16 | <0.15 |
| | 7 | 0.18 | 0.11 | 14 | <0.15 |
| | 8 | 0.20 | 0.12 | 14 | <0.15 |
| Comparative Material | 9 | Perforation | — | 9 | 0.84 |
| | 10 | 0.97 | 0.36 | 15 | 0.58 |
| | 11 | 0.69 | 0.40 | 12 | 0.42 |
| | 12 | 0.88 | 0.42 | 11 | 0.54 |
| | 13 | 0.95 | 0.71 | 19 | 0.59 |
| | 14 | 0.70 | 0.42 | 11 | 0.42 |
| Conventional Alloy (3003) | 15 | 0.80 | 0.60 | 12 | 0.50 |
| Conventional Alloy (6951) | 16 | Perforation | — | 16 | 1.10 |

As apparent from Table 3, it was confirmed that the clad materials using the inventive core materials are far superior to the conventional and comparative materials, in corrosion resistance after brazing, in terms of the As is apparent from FIG. 1, which shows the X-ray diffraction pattern, and FIG. 2 which shows the EPMA chart, of alloy No. 3 according to the present invention, Fe-containing intermetallic compounds are in the form of Al-Mn-Fe. This was the same for the other alloys according to the present invention. On the other hand, 3003 alloy includes an Al-Fe intermetallic compound, as is apparent from FIG. 3 and FIG. 4.

Figure 9:
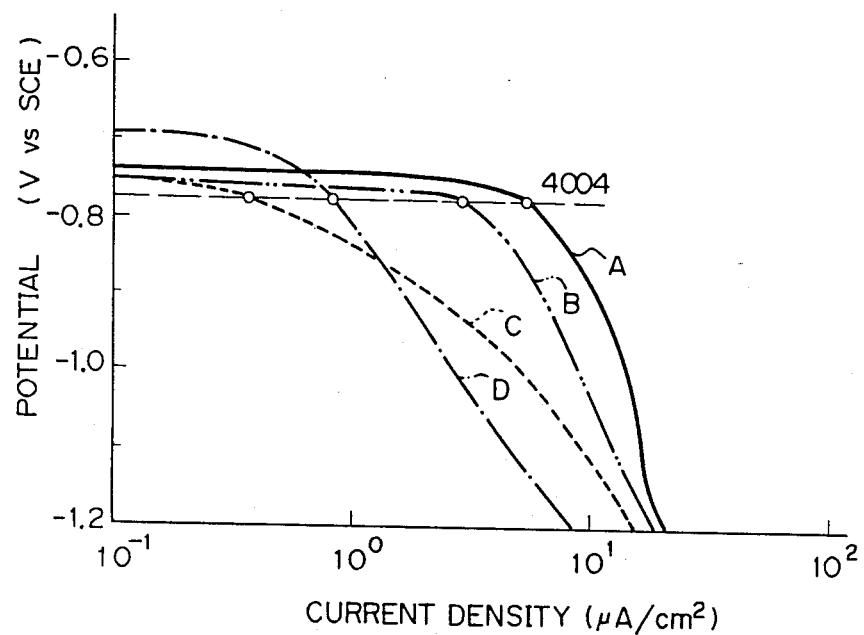
FIG. 9 shows polarization curves of 4004 and Al-Cu-(Mn/Ti) alloys.

FIG. 9 shows the result of the polarization measurement of the following compositions A, B, C, and D for the core material and 4004 alloy for the anode under the conditions given below.

A: Al—0.5% Cu—0.1% Fe
B: Al—0.5% Cu—0.6% Mn—0.1% Fe
C: Al—0.5% Cu—0.6% Mn—0.2% Ti—0.1% Fe
D: Al—0.5% Cu—1.0% Mn—0.1% Fe

4004

Vacuum Brazing—After heating to 605° C. for 5 minutes
Solution—2.67% $AlCl_3$ (pH=3)
Liquid Temperature—25° C.
Potential Sweep Speed—20 mV/min
$N_2$ gas degassing
4004 was polarized anodically.

Core Materials

Vacuum Brazing—After heating to 605° C. for 5 minutes
Solution—3.5% NaCl (pH=5.5)
Liquid Temperature—25° C.
Potential Sweep Speed—20 mV/min
Aerate The core materials were tested for contact corrosion with 4004, and then polarized cathodically.

As is apparent from FIG. 9, the polarization resistance increases with the addition of Mn and Ti, compared with the Al-Cu alloy. Accordingly, in the present invention, the corrosion current, at the intersection of the anode polarization curve of 4004 and the cathode polarization curve, decreases, so that the speed of corrosion of the anode is decreased, and hence, the secular corrosion resistance of the core material is enhanced.

We claim:

1. An aluminum alloy-core material for brazing, having an improved secular corrosion resistance due to a sacrificial anode or a filler metal, when used in the manufacture of brazed assemblies, which consists of 0.5~1.0% of Cu, 0.6~1.0% of Mn, 0.10~0.30% of Ti, or less of Fe, less than 0.10% of Si, and balance of Al, which exhibits only a slight reduction in mechanical strength after brazing, and, in which any Fe-containing intermetallic compound of Al further contains Mn, thereby rendering said material resistant against pitting corrosion.

2. An aluminum alloy according to claim 1, wherein the Fe content is at least 0.1%.

3. An aluminum alloy according to claim 1 or 2, wherein said alloy has a tensile strength of 12 $kgf/mm^2$ or more after heating for brazing.

4. An aluminum alloy according to claim 1 or 2, wherein the Mn content is 0.8% at maximum.

5. An aluminum alloy-core material for brazing, having an improved secular corrosion resistance due to a sacrificial anode or a filler metal, when used in the manufacture of brazed assemblies, which consists of 0.5~1.0% of Cu, 0.6~1.0% of Mn, 0.10~0.30% of Ti, 0.3% or less of Fe, less than 0.10% of Si, at least one element selected from the group consisting of from 0.05 to 0.4% of Mg, from 0.05 to 0.4% of Cr, and from 0.05 to 0.4% of Zr, and balance of Al, which exhibits only a slight reduction in mechanical strength after brazing and, in which any Fe-containing intermetallic compound of Al further contains Mn, thereby rendering said material resistant against pitting corrosion.

6. An aluminum alloy according to claim 5, wherein the Fe content is at least 0.1%.

7. An aluminum alloy according to claim 5 or 6, wherein said alloy has a tensile strength of 12 $kgf/mm^2$ or more after heating for brazing.

8. An aluminum alloy according to claim 5 or 6, wherein the Mn content is 0.8% at maximum.

* * * * *